Patented July 13, 1954

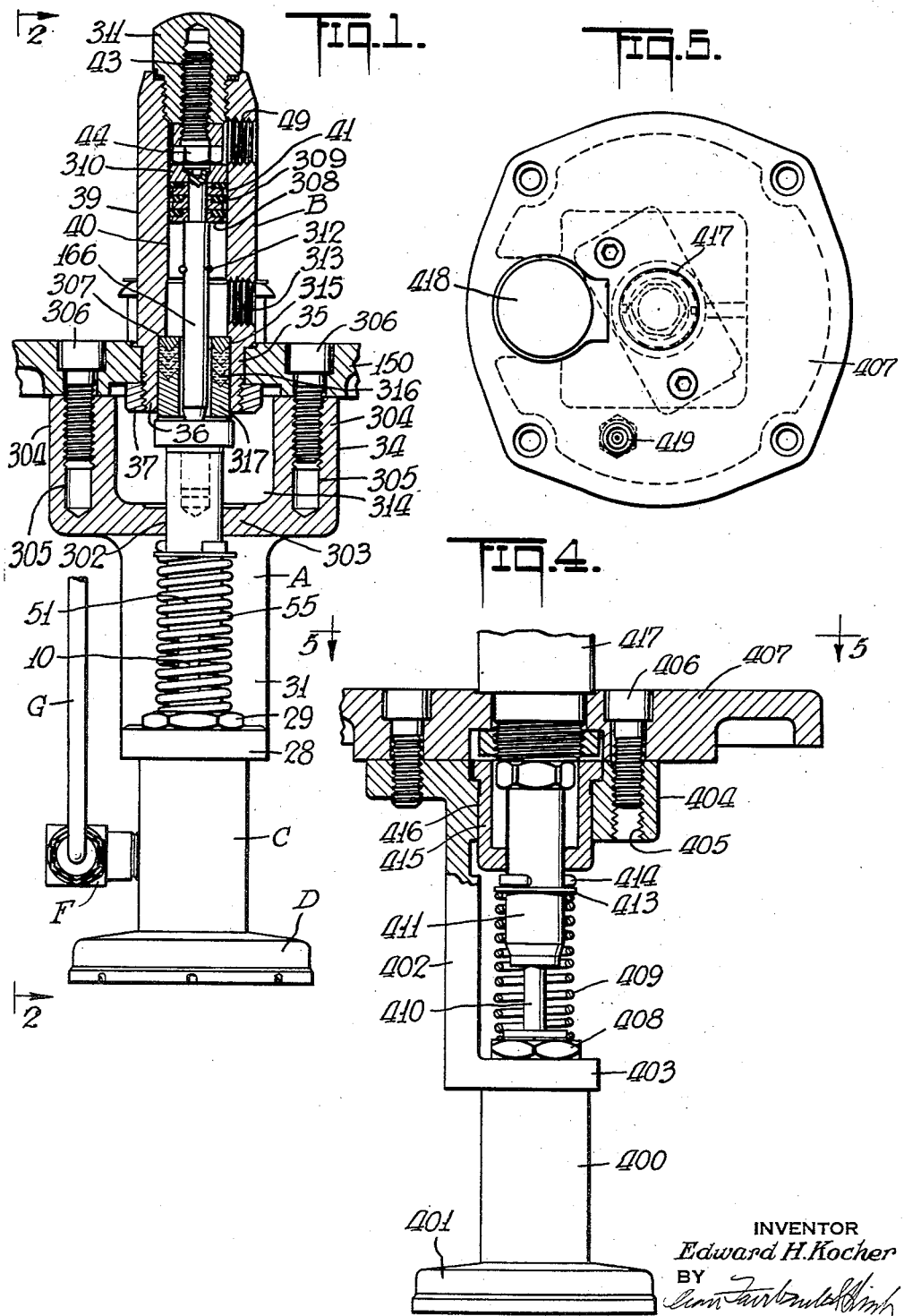

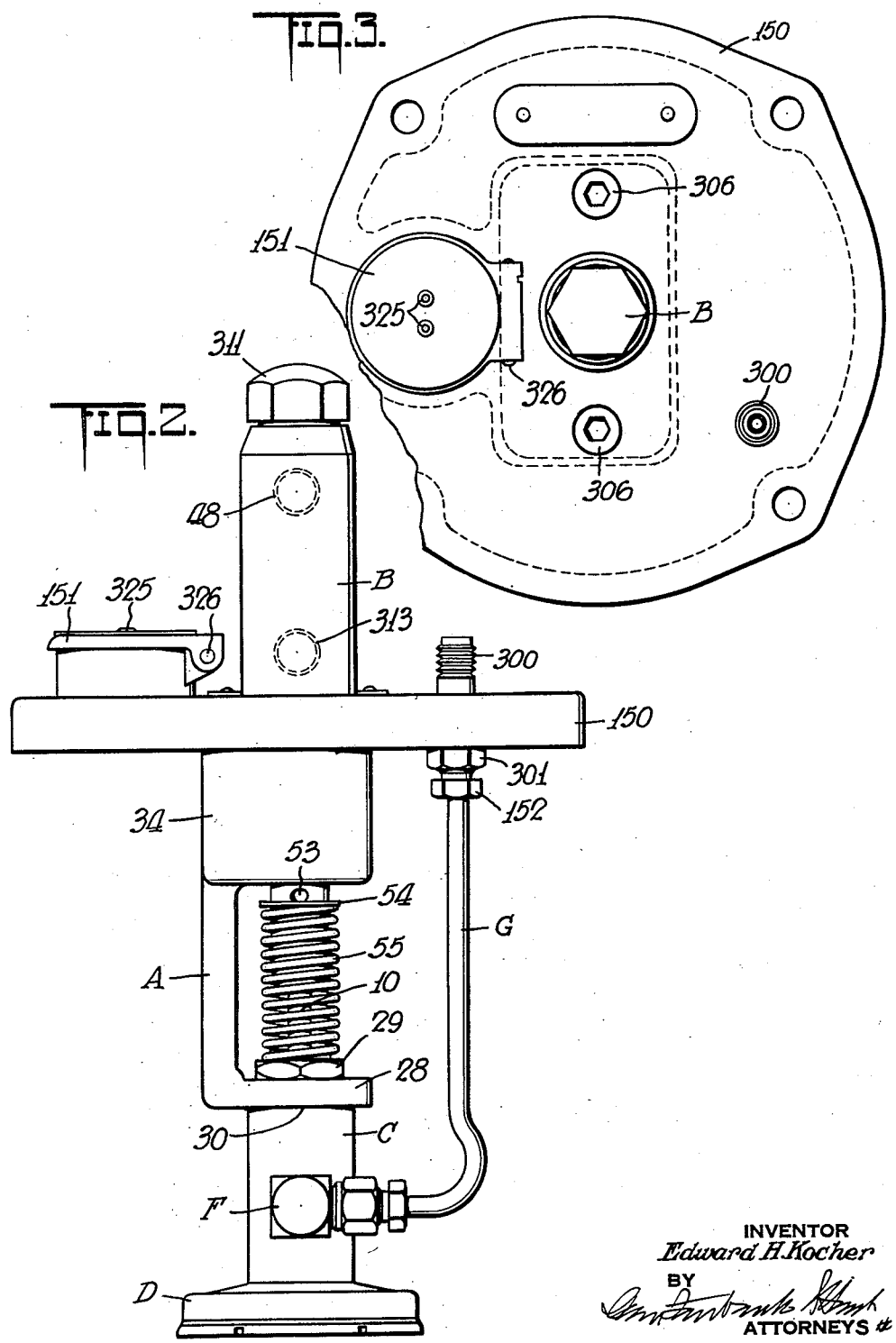

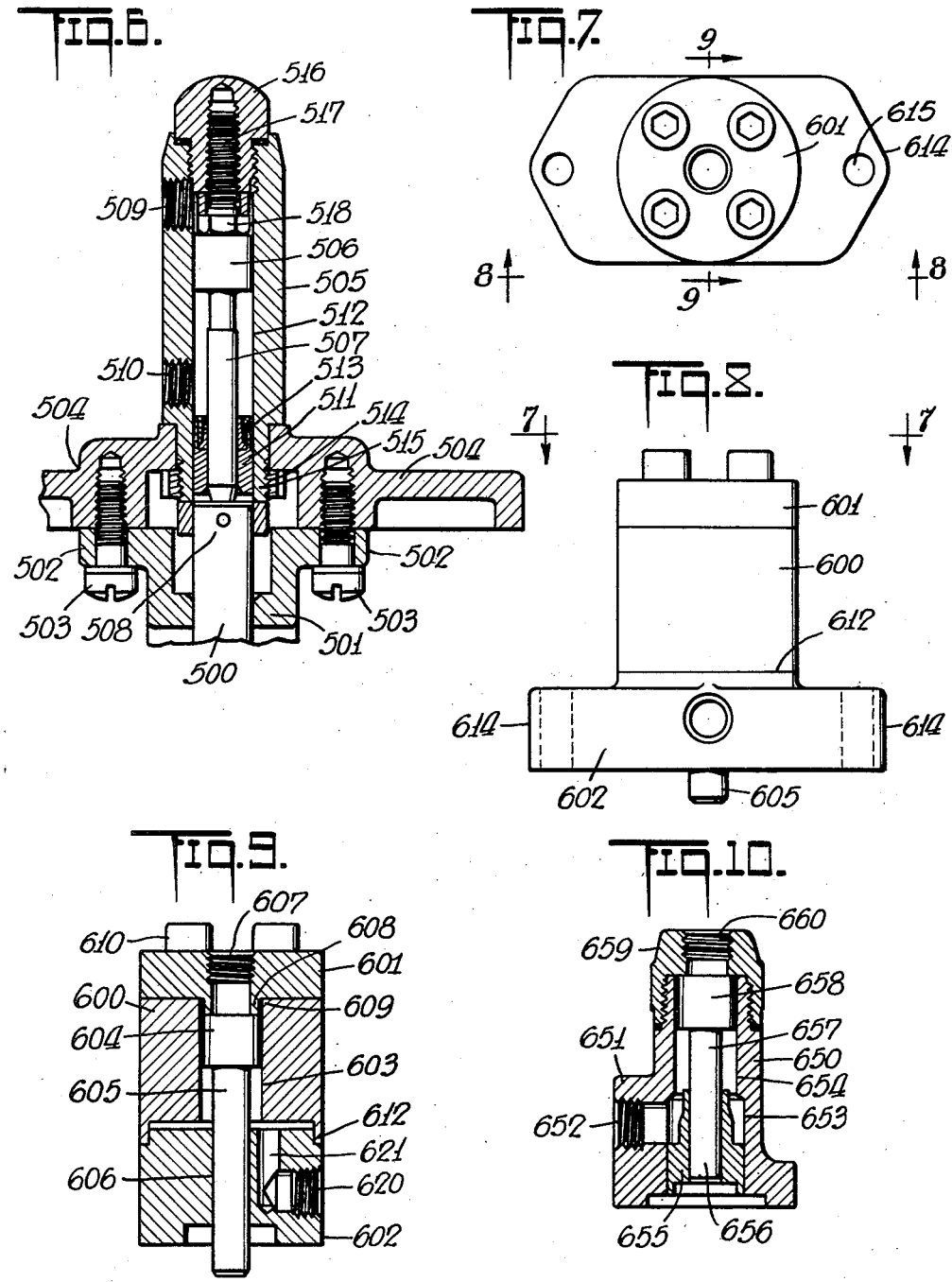

2,683,503

UNITED STATES PATENT OFFICE 2,683,503

HYDRAULICALLY ACTUATED LUBRICANT PUMP

Edward H. Kocher, Boonton, N. J., assignor to Auto Research Corporation, Dover, Del., a corporation of Delaware Application November 15, 1949, Serial No. 127,297

6 Claims. (Cl. 184—29)

The present invention relates to machine tool constructions, and it particularly relates to lubricated machine tool installations.

Although not restricted thereto, the present invention will be particularly described in connection with its application to lubrication of machine tool constructions which have in and about the machine tool a source of intermittent or varying oil or hydraulic pressure, and which machine tools have built therein an installation for supplying minute, yet accurately proportioned, quantities of lubricant to the various bearings in and about the same requiring lubrication.

It is among the objects of the present invention to provide an improved machine tool construction of the character described, in which without mechanical drive or without driving gears or levers, it will be possible to build unitarily therein means for lubricating and supplying lubricant to the various bearings in and around the machine tool, which lubricant will be supplied automatically by power derived from an intermittent oil or hydraulic pressure source in and around the mechanism to be lubricated.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to provide a distributing conduit or bore system in and around the mechanism to be lubricated having a single inlet from the lubricant pressure source and leading to the bearings to be lubricated, which bore system will carry a plurality of highly restricted full metering outlets affording a tremendously greater obstructing effect to the flow of lubricant than the tubing or bores extending through the mechanism or of the bearings to be lubricated.

In the preferred construction, the pressure source is positioned at or adjacent to a pocket or recess receiving a body of lubricant which may be replenished and which may be provided with indicator means to show when the lubricant has been or is about to be exhausted.

In the desired form of the invention, the source of lubricant pressure consists of two aligned reciprocating pressure-responsive or creating devices, one forming a pump and consisting of an elongated unpacked plunger fitted in an elongated body having a central bore, said body carrying suitable inlet and outlet ball checks and an inlet flow filter.

Connected to and supporting the body is preferably a bracket desirably of U-shape.

One leg of the U preferably carries the pump body, while the other leg desirably forms a bearing for a connecting rod which serves as a connection to a suitable pressure responsive motor, preferably of the piston cylinder variety. The cylinder of the motor is connected to the source of intermittent or varying hydraulic or oil pressure in and about the mechanism to be lubricated.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a longitudinal section view of one form of a central pressure source which may be associated with a mechanism of the type previously described.

Fig. 2 is a side elevational view taken upon the line 2—2 of Fig. 1.

Fig. 3 is a top plan view, partly broken away.

Fig. 4 is a fragmentary longitudinal vertical sectional view of an alternative embodiment showing the connection of the pump structure to the cover.

Fig. 5 is a top plan view of the alternative embodiment of Fig. 4 upon the line 5—5 of Fig. 4 and upon a reduced scale as compared to Fig. 4.

Fig. 6 is a transverse vertical sectional view of an alternative embodiment.

Figs. 7 to 9 illustrate still another alternative embodiment, Fig. 7 being a top plan view upon the line 7—7 of Fig. 8, Fig. 8 being a side elevational view upon the line 8—8 of Fig. 7, and Fig. 9 being a transverse vertical sectional view upon the line 9—9 of Fig. 7. Fig. 10 is a transverse vertical sectional view illustrating still another alternative embodiment similar in construction and operation to the embodiment of Figs. 7 to 9.

Referring to Figs. 1, 2 and 3, there is provided a mounting bracket A, an hydraulic motor B and a piston pump combination C.

The pump is provided with a filter structure D and with an outlet connection F leading to the external tubing arrangement G.

The bracket A is U-shaped and it has a base 31 with an outstanding leg 28 upon which is mounted the pump structure C by means of the nut 29 and the shoulder 30 at the top of the pump body.

The details of internal construction of the pump body C and the mounting upon the arm 28 are best shown in the copending application Serial No. 350,647 filed August 3, 1940, now Patent No. 2,487,812 issued November 15, 1949, of which this application is a continuation-in-part.

The conduit G through the outlet connection 300 will lead to a plurality of high lubrication flow metering fittings of the type shown in said co-pending application Serial No. 350,647.

The fitting 300 is mounted upon the cover 150 by means of the adaptor 301 of the compression coupling connection 152. The outlet connection F will receive a spring-seated ball check, as is shown in said copending application Serial No. 350,647.

The connecting rod 51 extending upwardly through the bracket base 303 carries the plunger 10 of the pump. The connecting rod is encircled by a coil spring 55 which presses upwardly upon the washer or disk 54, which is held in position by the pin 53, thus moving the plunger 10 to the top of its stroke.

The connecting rod 51 will pass through the opening 302 in the upper bracket structure 34, which has a base 303 and two upstanding legs 304. The legs are provided with tapped openings 305 which receive the bolts 306 which attach the cover 150 to the upper leg 34 of the bracket A.

Attached to the cover 150 is the motor body 33 which has a reduced diameter extension 35 carrying a threaded portion 36 receiving the nut 37 which clamps it in position. The body is recessed and shouldered at 307 to receive the support washer 315, seal packings 316 and sleeve 317. The sleeve 317 receives the lower end 166 of the motor piston 41. The motor piston 41 has a plurality of disks 308 with sealing rings clamped therebetween as indicated at 309 with a top disk 310.

The piston 41 will ride in the cylinder 40. At the top of the body B is a transverse tapped connection 49 for receiving hydraulic pressure from a source in or around the machine and the top of the cylinder 40 has a cap 311 which receives an adjustable screw 43 having the contact head 44. This head may be adjusted up and down to adjust the stroke of the piston 41.

The plunger 166 has the outwardly extending projections 312 which are stopped against the washer 315 as a safety feature to prevent pulling the piston out of the reamed portion of the cylinder.

The transverse tapped connections 313 will receive the pressure to return the piston.

As shown in Fig. 3, the cover 150 is provided with the filling opening 151 for the reservoir, which has the breathing openings 325 and the hinge 326.

In the embodiment of Figs. 4 and 5, the pump body 400 has a filter inlet 401 and a bracket 402 with a lower leg 403 and an upper leg 404. The upper leg 404 has the tapped openings 405 which receive the bolts 406 for attachment to the cover 407.

The pump body 400 is held in position by means of a nut 408 against which the coil spring 409 reacts. The coil spring 409 encircles the plunger 410 and the lower end of the connecting rod 411. The spring 409 at its upper end reacts against the washer 413 held by the pin 414. The connecting rod 411 extends into the cup 415, which is press-fitted at 416 into the upper leg 404 of the bracket 402.

The motor housing 417 may be of the same construction as the motor B of Figs. 1 to 3. The cover, as shown in Fig. 5, may have the filling opening 418 and the outlet connection 419 leading to the external bearings to be lubricated.

In the embodiment of Fig. 6 the connecting rod 500 extends up through the cup 501. The cup 501 has the flanges 502 which are held in position by the bolts 503 on the under side of the cover 504.

The motor body 505 receives a piston 506 having an extension 507 which reacts against the upper end 508 of the connecting rod 500.

The body 505 has transverse tapped connections 509 and 510, which serve the same purposes as the corresponding tapped connections 49 and 313, respectively, in Fig. 1.

The sleeve 511 which fits in the lower part of the bore 512 has a sealing means 513 to prevent the hydraulic liquid from passing into the cup 501. The reduced threaded extension 514 receives the nut 515 to clamp the body 505 against the cover 504.

The crown 516 receives the adjustable bolt 517 having the nut 518. The adjustment of the bolt 517 will adjust the stroke of the piston 506.

In the embodiment of Figs. 7 to 9, the body 600 has a cap 601 and a base 602. The body 600 has an internal bore 603 in which the piston 604 reciprocates. The piston 604 has an extension 605 which passes through the bore 606. The upper body member 601 has an inlet connection 607 with a nipple 608 which fits in the upper end 609 of the bore 603.

The bolts 610 hold the upper body member 601 in position and extend into the lower body member 602.

The middle body member 600 has a telescoping nipple connection at 612 to the lower body member. The lower body member has flanges 614 with openings 615 which enable said flanges to be bolted down upon the cover of a pumping mechanism.

The lower body member 602 has the connections 620 and 621 to feed pressure to the bottom of the piston 604 and also to permit egress of any of the liquid which has passed the piston when pressure is applied to the opening 607.

In the device of Fig. 10, the cylinder 650 has a boss 651 with a fluid opening or connection 652. In the lower enlarged portion 653 of the bore 654 is press-fitted the guide 655 for the lower end 656 of the extension 657. The extension 657 has a piston 658. The cap 659 has a tapped opening 660 which may be connected to the source of hydraulic pressure.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A hydraulically actuated lubricant pump unit for a centralized branched lubricating installation having a cover base plate, a hydraulic motor including a cylinder and a reciprocating piston therein, said motor being support on said base plate, a pump including a cylinder and a reciprocating piston therein supported below said base plate and connected to the bottom of said base plate, said cylinders and said pistons of said motor and pump being axially mounted, connecting rod means extending from the pump to the motor and connecting said pistons so that they will reciprocate together, an inlet to one end of the cylinder of the motor to supply hydraulic pressure thereto and cause said pistons and connecting rod means to reciprocate in one direction, a return coil spring encircling said connecting rod means and biased upon said reciprocation in one direction to return said pistons on a return stroke, and a threaded adjustment in said motor to adjust the stroke of the hydraulic piston, the pump being supported by a U-shaped bracket screw-connected at its upper end to the base plate and at its lower end to the pump cylinder.

2. A hydraulically actuated lubricant pump unit for a centralized branched lubricating installation having a cover base plate, a hydraulic motor including a cylinder and a reciprocating piston therein, said motor being support on said base plate, a pump including a cylinder and a reciprocating piston therein supported below said base plate and connected to the bottom of said base plate, said cylinders and said pistons of said motor and pump being axially mounted, connecting rod means extending from the pump to the motor and connecting said pistons so that they will reciprocate together, an inlet to one end of the cylinder of the motor to supply hydraulic pressure thereto and cause said pistons and connecting rod means to reciprocate in one direction, a return coil spring encircling said connecting rod means and biased upon said reciprocation in one direction to return said pistons on a return stroke, and a threaded adjustment in said motor to adjust the stroke of the hydraulic piston, the connecting rod means including a connecting rod attached to the motor piston and extending downwardly and a connecting rod attached to the pump piston and extending upwardly, said connecting rods contacting each other adjacent said base plate.

3. A central hydraulically actuated spring-returned elongated plunger metering pump for a centralized lubricating installation for machines having a hydraulic pressure source comprising a cover carrying a depending U-shaped bracket on its lower side and a cylinder on its upper side, said U-shaped bracket having upper and lower legs, the upper leg being bolted to the cover and a pump cylinder connected to the lower leg of said bracket, a plunger in each of said cylinders, and a return spring positioned between the legs of said bracket, said upper and lower cylinders being axially aligned with the plungers in said cylinders and connecting rods connected to said plungers, said connecting rods extending toward each other and abutting each other at said cover, said return spring being connected to the connecting rod of the plunger in the lower cylinder to cause said plunger to move to one end of the lower cylinder.

4. The pump of claim 3, the connecting rod for the plunger in the lower cylinder having an enlargement where it abuts the connecting rod for the upper plunger.

5. The pump of claim 3, said upper leg having an enlarged chamber, said chamber enclosing the point of abutment of the connecting rods.

6. The pump of claim 3, the upper end of the upper cylinder having a screw plug to adjust the stroke of the upper plunger.

References Cited in the file of this patent

UNITED STATES PATENTS

| Number | Name | Date |
|---|---|---|
| 281,010 | Brisben | July 10, 1883 |
| 828,326 | Manzel | Aug. 14, 1906 |
| 1,121,637 | Kreiss | Dec. 22, 1914 |
| 1,868,800 | Kreidel | July 26, 1932 |
| 1,982,093 | Zerk | Nov. 27, 1934 |
| 2,043,826 | Bijur | June 9, 1936 |
| 2,070,574 | Bijur | Feb. 16, 1937 |
| 2,224,502 | Grad | Dec. 10, 1940 |

FOREIGN PATENTS

| Number | Country | Date |
|---|---|---|
| 557,706 | France | May 9, 1923 |